June 9, 1959   E. A. STALKER   2,889,615
PROCESS FOR FABRICATING HOLLOW BLADES
Filed Feb. 23, 1955   2 Sheets-Sheet 1
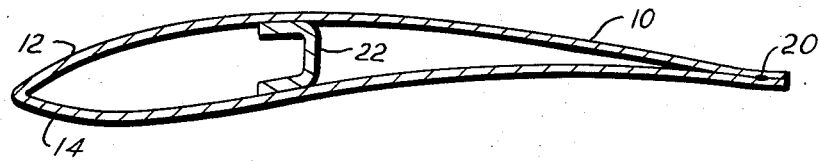
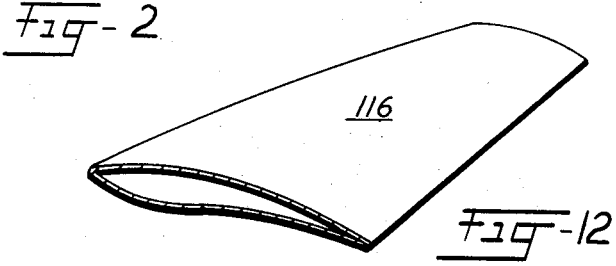
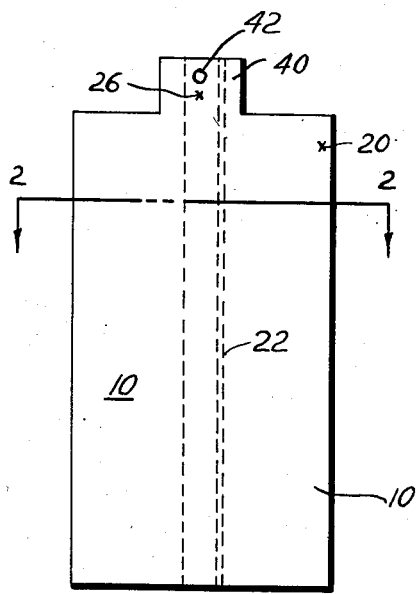
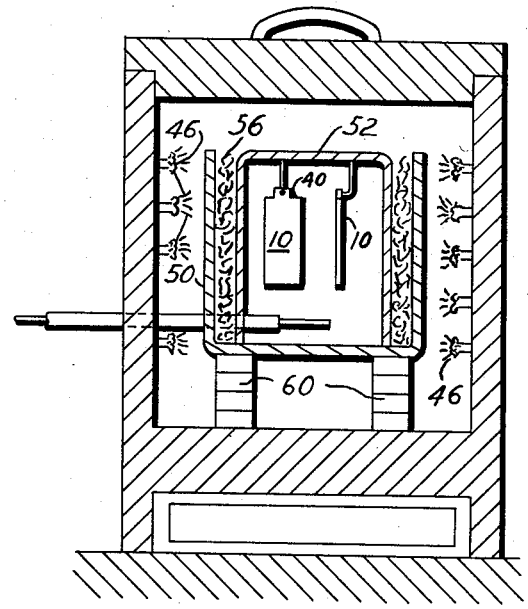
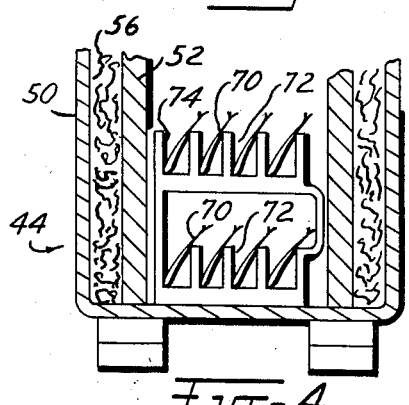
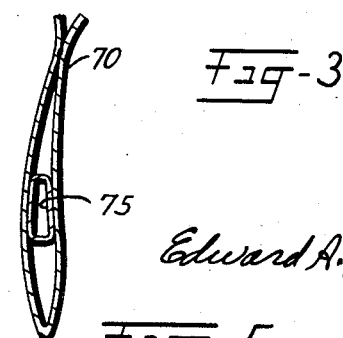
INVENTOR.
Edward A. Stalker June 9, 1959  E. A. STALKER  2,889,615
PROCESS FOR FABRICATING HOLLOW BLADES
Filed Feb. 23, 1955  2 Sheets-Sheet 2
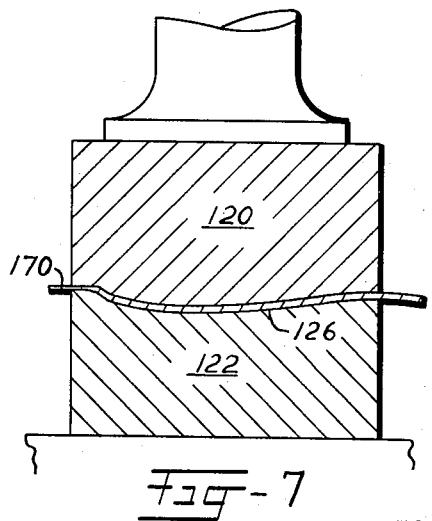
Fig-7
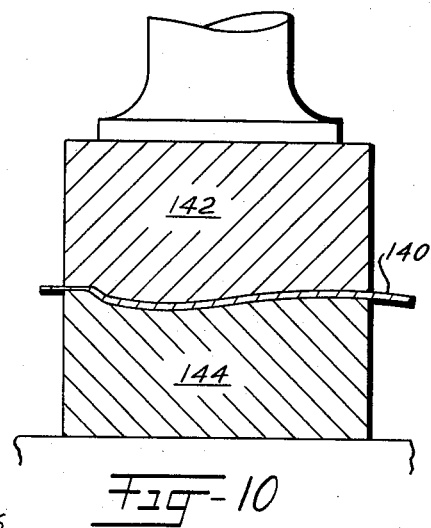
Fig-10
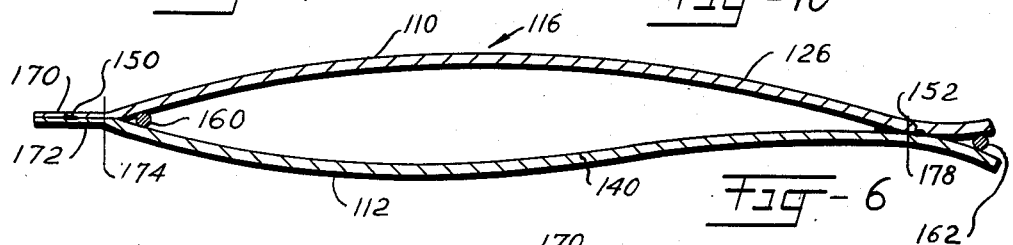
Fig-6
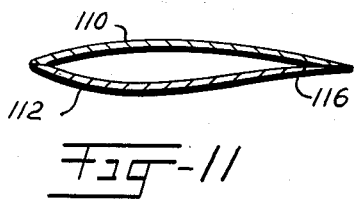
Fig-9
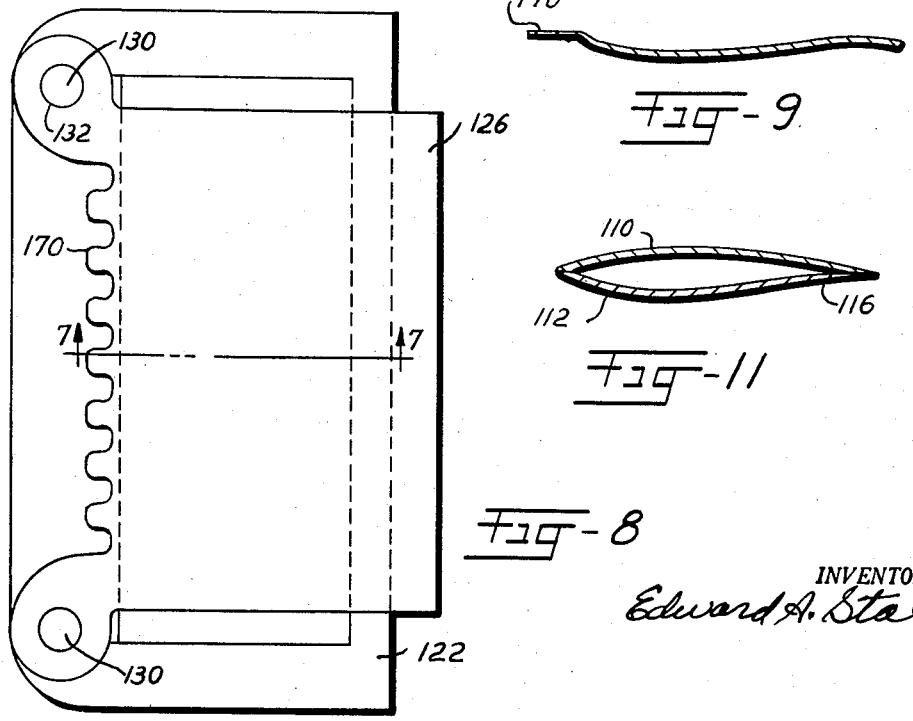
Fig-11
Fig-8
INVENTOR.
Edward A. Stalker

United States Patent Office 2,889,615
Patented June 9, 1959

2,889,615

PROCESS FOR FABRICATING HOLLOW BLADES

Edward A. Stalker, Bay City, Mich., assignor to The Stalker Corporation, a corporation of Michigan Application February 23, 1955, Serial No. 489,946

8 Claims. (Cl. 29—156.8)

This invention relates to blades for compressors, turbines and the like.

An object of the invention is to provide a process for fabricating hollow blades of parts brazed together precisely defining selected blade contours.

Another object is to provide a process of brazing blade parts together while retaining selected blade contours precisely.

Other objects will appear from the description, drawings and claims.

The above objects are accomplished by the means illustrated in the accompanying drawings in which:

Fig. 1 is a side elevation of a blade assembly prepared for brazing;

Fig. 2 is a section on line 2—2 in Fig. 1;

Fig. 3 is a vertical section through a brazing furnace;

Fig. 4 is a fragmentary vertical section through a brazing furnace showing an alternate arrangement for supporting blades;

Fig. 5 shows a section through another blade blank assembly also shown in Fig. 4;

Fig. 6 shows another blade blank assembly in section;

Fig. 7 shows a section through a die set for forming the upper section of the blade blank assembly of Fig. 6;

Fig. 8 shows a top view of the female die and blank of Fig. 7;

Fig. 9 shows the blank removed from the die set of Fig. 7;

Fig. 10 is a die set for forming the upper section of the blade blank assembly;

Fig. 11 is a section through a blade finished from the blade blank assembly of Fig. 6; and Fig. 12 is a perspective view of the blade of Fig. 11.

The blade envelopes 10 are formed over dies to be free of internal stresses of a type which would cause distortion or warping in a stress relieving operation. One method or process of producing such envelopes or parts thereof is described in my application, Serial No. 282,012, filed April 12, 1952.

The envelope 10 as shown in Figs. 1 and 2 comprises an upper wall 12 and a lower wall 14 supported one on the other at the leading and trailing edges. The trailing edge portions of the walls are preferably spot-welded together at 20.

The envelope encloses the beam 22 which is spot-welded in place preferably at only one locality 26, preferably at one end, Fig. 1, or at a limited number of localities relatively close together. The purpose of this is to allow the envelope and beam to expand at different rates without the bowing of one surface relative to the other. This assures that surfaces to be brazed together remain in sufficiently close proximity that melted solder will be retained between them by capillary attraction. If the gap became very large, greater than about 0.003 in., the solder could fall out or run to other localities causing a poor joint if any.

The braze material may be in the form of a paste applied to the corners formed by the beam and the blade walls and to the inside of the blade adjacent to the trailing edge; or the braze material may be in the form of a wire with a hook end to hang it over one or more of the walls of the envelope and beam.

The assembled blade, ready for brazing as shown in Figs. 1 and 2, has blade contours corresponding precisely to those selected for the blade, that is within the usual tolerances which are commonly as small as ±0.002 in. The assembly is next brazed in a furnace to retain these precise contours in the blade when it is removed from the furnace.

As shown in Fig. 3 each blade is hung by the tang 40 preferably by use of the hole 42. This is a good method and position of support when a simple beam is included in the blade.

The blades are supported within a box assembly 44 of substantial wall thickness so that they receive heat substantially uniformly over their whole areas from the box walls. That is a blade should not be heated by a distinct ray of heat playing on a localized area of a blade. Thus as shown in Fig. 3 the heat from localized distinct sources such as 46 plays upon the walls of the box assembly 44 and is spread by conduction substantially uniformly through each and hence very uniformly to the blade surfaces.

Preferably the box assembly comprises an outer box 50 and an inner box 52 spaced at its sides from the outer box. The space between is filled with a sealant 56 such as sand and the like. The sealant should extend upward from the bottom for about 6 inches but may fill the full depth to facilitate more uniform heating of the side walls of the inner box. It is these sides which radiate heat most directly to the blade surfaces when the blades are positioned with their broad surfaces substantially vertical.

The box assembly may be supported on brick columns 60 as shown in Fig. 3.

In another arrangement the blades are supported on one of their edges on a rack means 74 as shown in Fig. 4. The blades 70 each rest loosely in a notch 72 of the rack means. The rack may support one or more blades, preferably a plurality of blades, and is a supporting fixture for a blade. The blades may have the configuration of that of Fig. 5 with a hollow beam 75 within, for instance.

It is to be noted that the blades are supported free of any fixtures contiguous to the walls for impressing dimensions on the blades. With the proper method of fabrication such fixtures are not required. A great saving in the cost of fabrication is made by their omission since the fixtures must be made as accurately as the blades and they must be continually brought back to dimensions since they are distorted by repeated heatings and coolings.

In another process for forming the blade sections they are given their form by one or more of a series of operations such as stamping (pressing), or rolling between male and female dies each a plurality of times with the stresses relieved between said operations by heating preferably in a furnace. For instance the upper section may be formed by stamping between male and female dies respectively. After the first striking with the dies the parts are placed in a furnace and stress-relieved by heating to a temperature of about 1400° F. for a short period of time for instance. Then the parts are each placed back in the dies preferably located by locating pins so that they are struck by the dies precisely as in the first striking operation. Depending on the degree of accuracy they may again be stress-relieved and again struck between the dies. After two or more such striking and heating operations the sections will retain their shape precisely upon being heated to a brazing temperature without being restrained by fixtures to preserve their contours.

Referring now particularly to Figs. 6–11 the upper and lower sections, 110 and 112 respectively of blade 116, as shown in Fig. 6 can each be produced in dies by stamping or pressing. Fig. 7 shows a set of dies comprising the male die 120 and the female die 122 with the upper blade blank 126 between them. Fig. 8 is a plan view of the female die with the blank 126 in place. Locating pins 130 pass through holes 132 in the blank and locate it always in the same positions relative to the die.

After the blank is struck or pressed by the male die in the first operation it is heated to relieve the internal stresses arising from the high spots in the dies, that is points where the dies come closer together than at other points. Possibly this may only be a few one-millionths of an inch but it is enough to cause the metal to flow out radially from such points causing strains in the metal which will cause warpage of the blade upon heating. Another cause of such localities of internal distortion is the variation of thickness of the sheet which is always present in commercial sheet at least.

Upon heating after the first stamping operation the internal stresses and strains are relieved but the part distorts in shape from the selected contours. However when the blank is again placed in the dies and located in the same precise relationship to the dies (by the pins) that it had after the first operation, it may be stamped again with the result that there are less internal strains put into the blank because it has been brought to compensating thickness at the high spots. Each repetition of stamping and heating brings the blank nearer to the selected contours after the heating operation. Usually two cycles of stamping and heating and a third or final stamping puts the blank in sufficiently good internal condition that it can be assembled into a blade and brazed without the blade distorting outside the usual tolerance when the furnace apparatus and operation accord with the technique described earlier in connection with Figs. 3 and 4.

The lower section 140 is pressed between dies, namely 142 and 144, Fig. 10 and stress-relieved by heating in cycles of operation in a process similar to that described for the upper section.

The two sections 126 and 140 are juxtaposed as shown in Fig. 6 to form a hollow blade blank assembly (also called blade assembly) preferably fixed together at spot-welds 150 and 152.

This blade assembly is next placed loosely in a fixture or rack means as shown in Fig. 4 with braze materials at 160 and 162. Since the blade blanks are free of internal stress they may be brought to brazing temperatures, usually about 2150° F. for high temperature braze materials, and the assembly will retain precisely the selected contours within the selected tolerances, for instance ±0.002. During this brazing operation no fixtures are employed to establish the shape of the contours but on the other hand the surfaces are free of dimension determining fixtures. That is no fixtures are contiguous to the surfaces in constraining relation thereto to restrain warping of the walls. Such a type of fixture is not required since the walls are free of tendency to do this.

It is important that the blade blank assembly be supported on an edge or be hung to retain the selected shape of the blade.

Preferably the blade assemblies are positioned on edge with broad sides of the blades facing each other. This is readily accomplished in a rack as shown in Fig. 4 where they rest on the leading edge portions. This arrangement of blades provides for more uniform heating of the blades since they reflect heat back and forth from one to the other, and therefore there is less tendency for them to be distorted.

Preferably the dies are shaped to reduce the thicknesses of the spanwise spaced tangs 170 and 172 which serve the same purpose as tangs 40, i.e., for spot welding to secure the two blade walls together prior to the brazing operation. Following the brazing the tangs are cut off at the leading edge on line 174, Fig. 6, and there is very little finishing needed for the leading edge. The tangs have short spanwise lengths as shown in Fig. 8 to reduce the pressure required to thin them to a thickness less than the thickness of the walls near their noses and to provide for the flow of metal under the thinning operation. The thinning of the tangs may also be done before the pressing of the blanks to form the blade contours. The trailing edge is finished by cutting off the excess material at the line 178 and deburring or rounding the edges. The blade then appears as shown by its cross section in Fig. 11 and its perspective in Fig. 12.

The blade sections are taken along the direction of the relative flow, that is chordwise, as shown in Fig. 6. The span of a blade extends perpendicular to the blade section.

It will now be clear that a novel process has been disclosed for preserving the precise contours of blades during the brazing operation including novel techniques of treating the blades in the brazing furnace. These consist in part of the proper heating and protection of the blades and the provision of proper supports to preserve the precise contours of the blades through the brazing operation. The process does not require fixtures for impressing dimensions on the blade and accordingly saves the great cost associated with providing and maintaining such fixtures.

The process of fabricating the blades also includes a novel means of providing blade assemblies which, when properly treated in the furnace by the techniques disclosed, provides brazed blades of precise contours.

While I have illustrated specific forms of the invention, it is to be understood that variations may be made therein and that I intend to claim my invention broadly as indicated by the appended claims.

I claim:

1. A process of fabricating precisely shaped hollow brazed sheet metal blades for use in compressors, turbines, and the like and substantially free of internal stress tending to cause deformation under the high temperatures of brazing and in use, said blades having separate upper and lower walls of preselected blade contours and of a chordwise length extending substantially from the leading edge to the trailing edge of said blade, comprising the steps of performing a plurality of cycles of operations on each of said walls including pressing said walls on dies of contours corresponding to said preselected blade contours followed by heating said walls to relieve them of internal stress from said pressing, again pressing said walls separately on their respective said dies to said final preselected blade contours while the edges of one said wall are free of the edges of the other said wall, locating said walls in precisely the same positions on said dies during each pressing operation to produce stress-free walls of said preselected contours corresponding substantially to said die contours and precisely to said preselected blade contours, securing said walls with said completed preselected contours in a blade assembly by fixing said walls at spanwise spaced localities outwardly of the leading and trailing edges and with said walls supported one on the other along lengths of brazing surfaces at the leading and trailing edges, placing brazing material at said brazing surfaces, placing said assembly in a fixture with said blade walls free of spanwise spaced contour determining fixture parts contiguous thereto over a major portion of the blade chord length, and heating said assembly and fixture throughout substantially uniformly to brazing temperature completing said brazing operation and retaining said preselected contours throughout said operation.

2. The process of claim 1 wherein a concavity is pressed in the lower wall over a major portion of the chordwise length thereof while it is free of the upper wall.

3. The process of claim 1 wherein the heating is carried out at a temperature of about 1400° F.

4. The process of claim 1 wherein the blade assembly in the fixture is stood on its leading edge with its chord extending in the general vertical direction and placed in a box heated externally to heat said assembly substantially uniformly throughout.

5. The process of claim 4 in which a non-oxidizing atmosphere is maintained in said box during the heating.

6. The process of claim 1 wherein the step of placing each wall on the die includes engaging the wall with means positively positioning one edge of the wall leaving the opposite edge free of constraint chordwise and spanwise.

7. The process of claim 1 wherein tangs at the nose of the blade assembly are fixed together temporarily at spanwise spaced points, and in which the tangs are cut off following said brazing and the nose of the blade is finished.

8. A process of fabricating precisely shaped hollow brazed sheet metal blades substantially free of internal stress tending to cause deformation under the high temperatures of brazing and in use and having separate upper and lower walls of preselected blade contours in which each blade interfits with a separately fabricated supporting part to insure close fitting engagement therebetween for bonding together by brazing, comprising the steps of performing a plurality of cycles of operations on each of said walls including pressing said walls on dies of contours corresponding substantially to said preselected blade contours followed by heating said walls to relieve them of internal stress from said pressing, again pressing said walls on their respective said dies to said final preselected blade contours, locating said walls in precisely the same positions on said dies during each pressing operation to produce stress-free walls of said selected contours corresponding substantially to said die contours, securing said walls with said completed preselected contours in a blade assembly by spot-welding and with said walls supported one on the other along lengths of brazing surface, inserting a beam spanwise into said blade assembly in close engagement with each said wall, placing brazing material at said brazing surfaces and adjacent the joints between said beam and said assembly, placing said assembly loosely in a fixture with said blade walls free of spanwise spaced contour determining fixture parts contiguous thereto over a major portion of the blade chord length, and heating said assembly and fixture throughout substantially uniformly to brazing temperature completing said brazing operation while retaining said preselected contours throughout said operation.

References Cited in the file of this patent

UNITED STATES PATENTS

| | | |
|---|---|---|
| 2,427,747 | Schneider | Sept. 23, 1947 |
| 2,577,336 | Lampton | Dec. 4, 1951 |
| 2,649,243 | Stalker | Aug. 18, 1953 |
| 2,699,598 | Daughtery | Jan. 18, 1955 |
| 2,723,445 | Trautvetter | Nov. 15, 1955 |

FOREIGN PATENTS

| | | |
|---|---|---|
| 11,286 | Great Britain | 1915 |
| 733,133 | Germany | Mar. 19, 1943 |

OTHER REFERENCES

"Precision 'Atmosphere' Forging" by E. G. de Coriolis, pages 90–94, Steel magazine, April 1946.